United States Patent [19]
Fujita

[11] Patent Number: 5,243,362
[45] Date of Patent: Sep. 7, 1993

[54] ROLLED SHEET ROLLING CONTROL METHOD OF PAPER-MOVING TYPE PLOTTER

[75] Inventor: Joji Fujita, Tokyo, Japan

[73] Assignee: Mutoh Industries, Ltd., Tokyo, Japan

[21] Appl. No.: 854,898

[22] Filed: Mar. 20, 1992

[30] Foreign Application Priority Data

Apr. 24, 1991 [JP] Japan .................. 3-119095

[51] Int. Cl.⁵ .................................. B41J 11/42
[52] U.S. Cl. ............................ 346/136; 400/618
[58] Field of Search ................... 346/136, 1.1; 242/67.1 R, 67.2, 67.3 R; 400/618

[56] References Cited

U.S. PATENT DOCUMENTS

| | | | |
|---|---|---|---|
| 4,043,440 | 8/1977 | Busch | 400/618 |
| 4,172,565 | 10/1979 | Zaffarano | 246/67.1 R |
| 4,823,147 | 4/1989 | Charroppin | 346/136 |
| 4,924,240 | 5/1990 | Herbert et al. | 346/1.1 |
| 5,117,241 | 5/1992 | Stephenson | 346/76 PH |
| 5,117,242 | 5/1992 | Matsushima | 346/1.1 |

FOREIGN PATENT DOCUMENTS

0018364  1/1985  Japan .

Primary Examiner—Benjamin R. Fuller
Assistant Examiner—N. Le
Attorney, Agent, or Firm—Sughrue, Mion, Zinn, Macpeak & Seas

[57] ABSTRACT

Shock or impact forces applied to a paper sheet when the paper sheet is rolled up in a paper-moving type plotter are relieved thereby preventing the paper sheet from being torn or from being displaced from between a pinch roller and a drive roller. While a part of the rolled paper sheet 15 hanging down at a side of the rolling scroll 2, is rolled up due to the rotation of the rolling scroll 2, a load of the drive roller 11 gripping the paper sheet 15 on the platen 1 is monitored by an output of the encoder 20. When a load is applied to the drive roller 11 and rotation of the rolling motor 4 driving the rolling scroll 2 is paused, a part of the rolled paper sheet 15, which part substantially corresponds to the rotation volume due to inertia of the rolling scroll 2, is fed to a side of the rolling scroll 2 by a rotation of the drive roller 11. As a result, no shock or impact is applied to the rolled paper sheet 15 when the rolled paper sheet is wound on the rolling scroll 2.

2 Claims, 3 Drawing Sheets

ROLLED SHEET ROLLING CONTROL METHOD OF PAPER-MOVING TYPE PLOTTER

BACKGROUND OF THE INVENTION

The present invention relates to a rolled sheet rolling control method of a paper-moving type plotter or a sheet-drive type automatic drafting machine.

PRIOR ART

According to a conventional paper-moving type plotter of this kind, a torque limiter is provided between a sheet rolling scroll and a sheet rolling motor, and a rotation of the scroll for a predetermined time period rolls up a predetermined length of a paper sheet on the scroll.

Even though a rolling of a part of the rolled paper for one drawing is over, the rolling motor is continuously driven. However, the rolling scroll pauses due to a load applied to the scroll from the rolled paper, and the rotary force of a drive shaft of the rolling motor is prevented from being transmitted to the rolling scroll by a provision of the torque limiter.

When the load of the rolled paper stops the running of the rolling scroll, a large tension or shock is applied to the rolled paper and a paper sheet from the rolled paper resulting in a shift or displacement of the paper sheet from between the drive roller and a pinch roller. This is clearly a disadvantage of the conventional paper-moving type plotter of an automatic drafting machine.

SUMMARY OF THE INVENTION

Consequently, it is a main purpose of the present invention to provide a novel rolled sheet rolling control method of a paper-moving type plotter of an automatic drafting machine for reducing an impact which is applied on the rolled paper when the rolling scroll is paused due to a load of the rolled paper, preventing the paper sheet from shifting or displacing.

In order to attain the above object, a load of the drive roller 11 is monitored by an output of the encoder 20 when a part of the paper sheet 15, on which part of the drawing has been completed, is hung down at a side of the rolling scroll 2 and is rolled up by a rotation of the rolling scroll 2. When a slack part of the sheet paper 15 is rolled up on the rotating rolling scroll 2, and a tension of the rolled paper applies a load (rotation force) to the drive roller 11, the load is detected by the encoder 20 and a driven condition of the rolling motor 4 driving the rolling scroll 2 is stopped. Also the drive roller 11 rotates to feed, to the rolling scroll 2, a part of the paper sheet or rolled paper substantially corresponding to a rotated volume of the rolling scroll 2 due to its rotary inertia.

According to the present invention, it is possible to carry out a rolling of the paper sheet at a high speed in order to detect a finish of rolling-up of the rolled paper as described above. It is possible to relieve the impact of the rolled paper and prevent the rolled paper being shifted relative to the drive roller and the pinch roller so as to immediately send or feed a paper sheet at the same time as a finish of rolling-up of the paper sheet. In addition, according to the present invention, an encoder necessary to the drive roller detects a load of the drive roller and the result is processed. Thus, it is not necessary to install any special mechanism or appliance such as a torque limiter. It is an excellent effect of the present invention.

DETAILED EXPLANATION OF THE INVENTION

Figure 1:
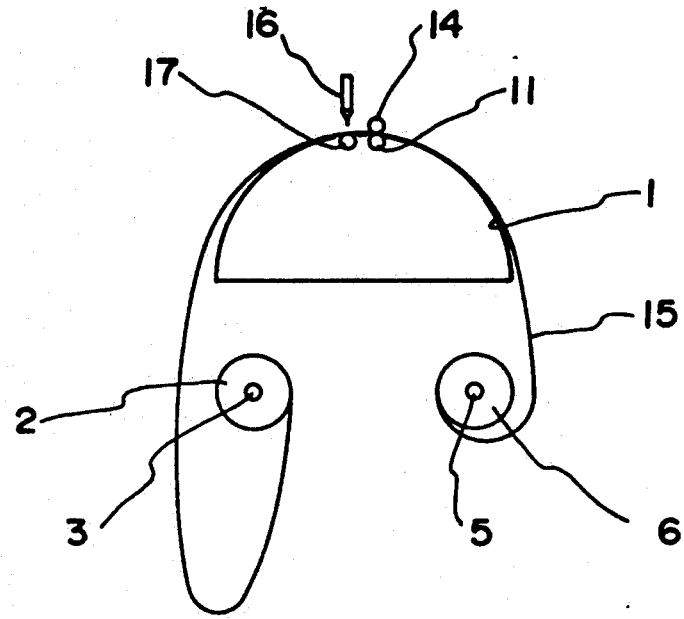
FIG. 1 is a side elevation of a paper-moving type plotter of an automatic drafting machine showing a rolled paper rolling operation of the paper-moving type plotter.

An embodiment of the paper-moving type plotter according to the present invention will be explained with reference to the accompanying drawings.

In front and below the platen 1 for mounting paper sheet on it of the paper-moving plotter, there is a rolling means 3 rotatably arranged so as to detachably support a rolling scroll 2.

The rolling means 3 is operatively connected to the drive shaft or output shaft of the rolling motor 4, so that the rolling means 3 is driven by the motor 4.

A feeding means 5 is rotatably arranged to one side of and below the platen 1 in order to detachably support the rolled paper supply scroll 6. The feeding means 5 is connected to an output shaft of a feeding motor 7 so as to be rotatably driven by the motor 7.

The rolling motor 4 and the feeding motor 7 are connected to a controller 10 through drivers 8 and.

A drive roller 11 is rotatably placed in a slit formed in a Y-axis direction of the platen 1 and the drive roller 11 is connected to an output shaft of a sheet driving motor 12 controlled by the controller 10.

The motor 12 is connected to the controller 10 through a driver 13. A pinch roller 14 is adjacent to and placed above the drive roller 11.

A paper sheet 15 is gripped by and between the pinch roller 14 and the drive roller 11. A reversible rotation or reciprocating motion of the drive roller 11 feeds or moves the paper sheet 15 along a front-and-rear direction on the platen 1. Simultaneously, a pen 16 supported on the drawing head is made to come in contact with the paper sheet 15 on the drawing roller 17 and sent in the Y-axis direction of the Y-rail, so that a predetermined pattern is drawn on the paper sheet 15 on the platen 1.

A drawing means 18 consisting of the drawing head and a pen 16 is constructed to be controlled by the controller 10.

A drive roller load monitoring program 19 stored in the controller 19 is adapted to recognize the load of the drive roller 11 on the basis of signals of the output end of the encoder 20 detecting rotations of the output shaft of the drive motor 12.

The operation of one embodiment of the rolled paper sheet rolling control method according to the present invention will now be explained.

After the drawing operation is over, a command from the controller 10 controls the drive roller 11 so that a portion of the paper sheet 15 (on which part of a drawing has been completed) hang down at a side of the rolling scroll 2 due to a rotation of the drive roller 11 as shown in FIG. 1.

Figure 2:
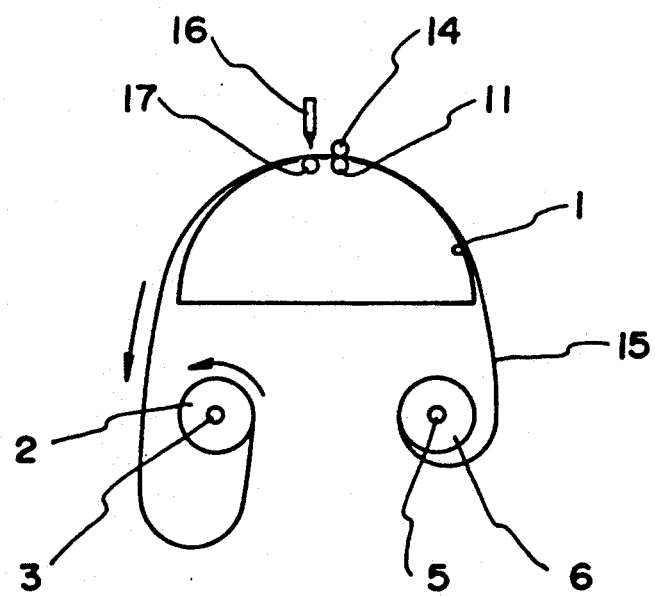
FIG. 2 is another side elevation of a paper-moving type plotter of an automatic drafting machine showing a rolled paper rolling operation of the paper-moving type plotter.

Next, as shown in FIG. 2, the controller 10 drives a motor 4, with the drive roller 11 stopped, to rotate the rolling scroll 2 thereby rolling in a depending, paid-out portion of the rolled paper 15.

Then, the drive roller load monitoring program 19 starts a monitoring of the load of the drive roller 11.

Figure 3:
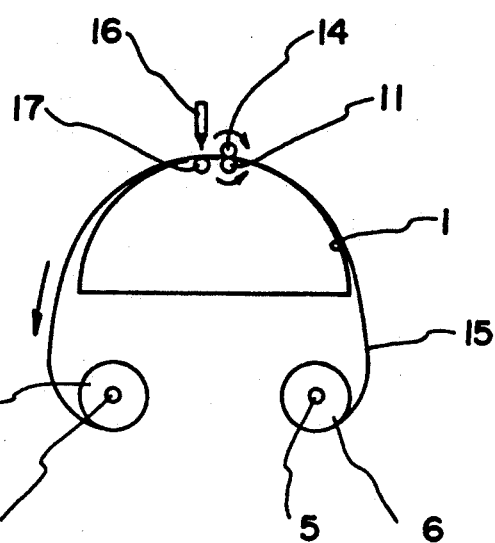
FIG. 3 is still another side elevation of a paper-moving type plotter of an automatic drafting machine showing a rolled paper rolling operation of the paper-moving type plotter.

At the same time as the instant of an end of the rolling-up of the paper sheet or the rolled paper 15 by means of the rolling scroll 2, as shown in FIG. 3, a tension is applied to the paper sheet 15 gripped between the drive roller 11 and the rolling scroll 2 and, a load is applied to the drive roller 11 resulting in a small rotation of the drive roller 11 due to a tension applied by the rolled paper 15.

The drive roller load monitoring program 19 detects the load applied to the drive roller 11, outputs a signal showing a finish of a rolling-up of the paper sheet, and a load monitoring of the drive roller 11 is therebefore complete.

Figure 4:
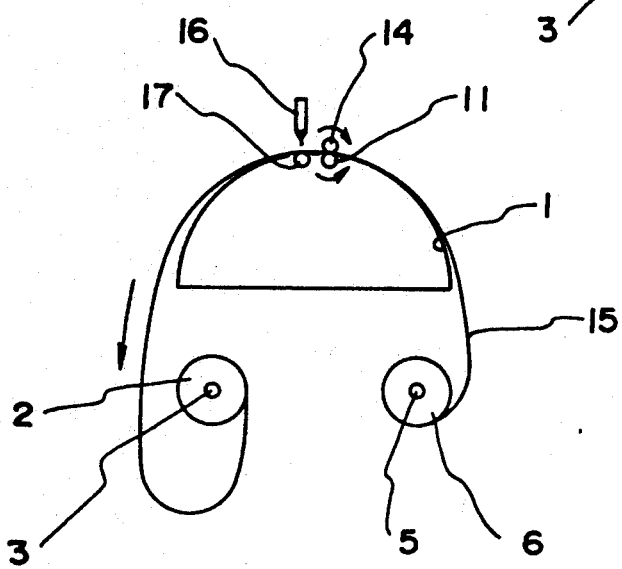
FIG. 4 is still another side elevation of a paper-moving type plotter of an automatic drafting machine showing a rolled paper rolling operation of the paper-moving type plotter.

The controller 10 receives the signal from the drive roller load monitoring program 19 and a command for stopping or pausing the rolling motor 4 is outputted to the driver 8. At the same time as a dispatch of the rolling motor stopping command, the controller 10 rotates the drive roller 11 counterclockwise by a predetermined amount, as shown in FIG. 4, to compensate for the inertial rotation of the rolling scroll 2 in the counterclockwise direction. That is, due to the counterclockwise rotation of the drive roller 11, the rolling scroll 2 is allowed to rotate inertially counterclockwise after a dispatch of the rolling motor stopping command. Thus, the rolled paper 15 is paid out by an amount corresponding to the total volume of the paper sheet to be rolled up and the predetermined amount mentioned above for compensating for the inertial rotation of the rolling scroll 2.

Such rolled paper feeding operation due to a rotation of the drive roller 11 relieves the impact of tension given to the rolled paper or paper sheet 15.

Figure 5:
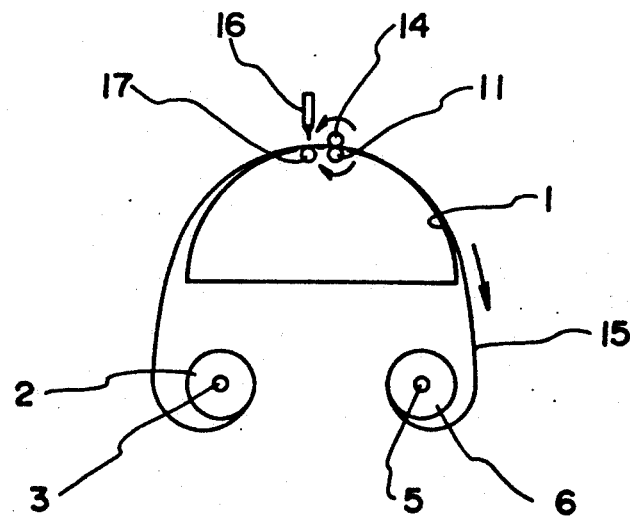
FIG. 5 is still another side elevation of a paper-moving type plotter of an automatic drafting machine showing a rolled paper rolling operation of the paper-moving type plotter.
Figure 6:
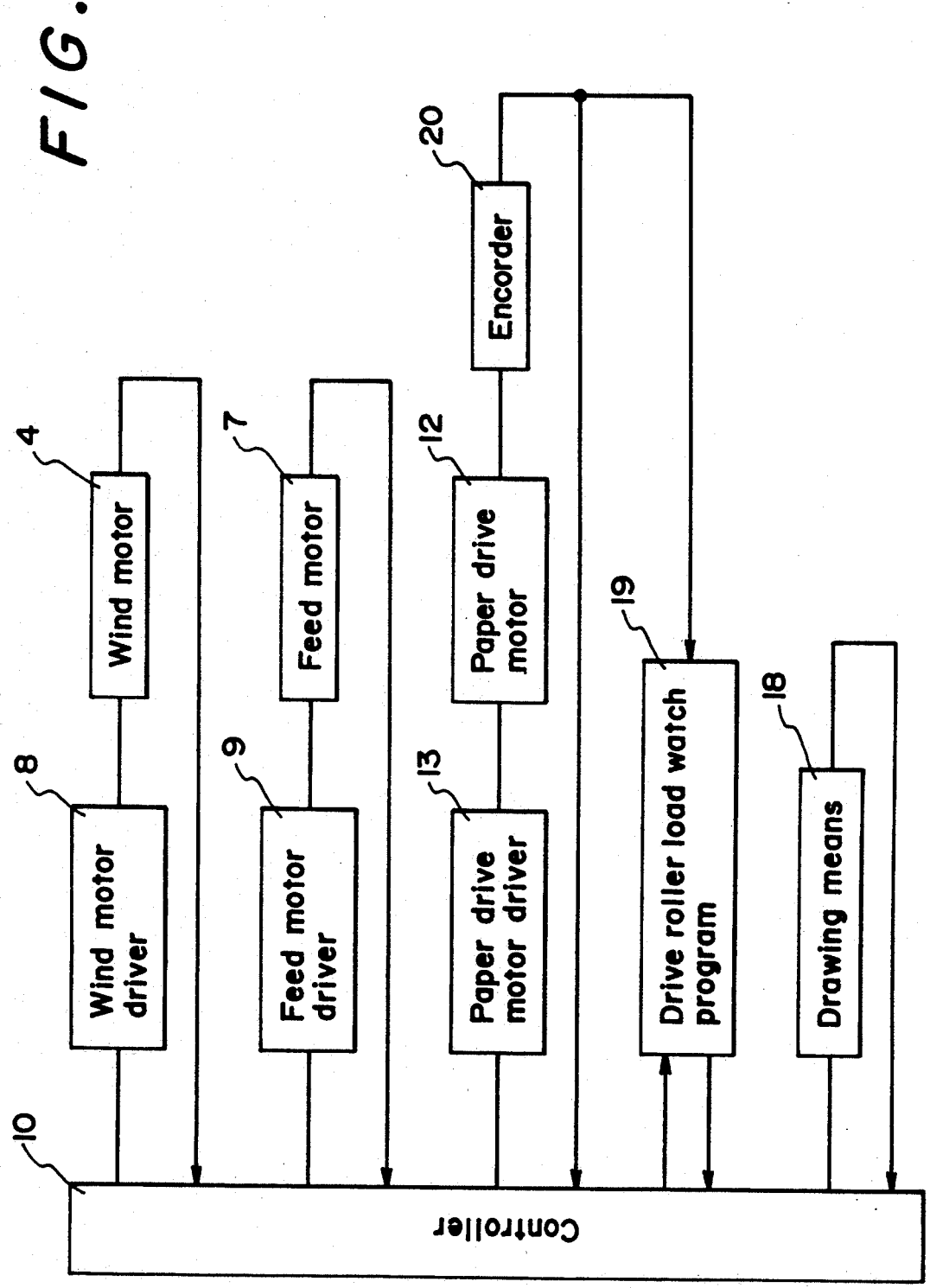
FIG. 6 is a block diagram of the drive portion of the paper-moving type plotter.

Next, as shown in FIG. 5, the controller 10 rotates the drive roller 11 clockwise so as to return or reverse a part of the paper sheet 15, which part has been fed to the side of the rolling scroll 2 in the previous step, to the ordinal or correct position of the paper sheet 15.

What is claimed is:

1. A rolled sheet rolling control method for a paper-moving type plotter including a platen for supporting the rolled sheet during printing, a rolling scroll and a supply scroll, a drive motor for rotating the rolling scroll, a drive roller and a pinch roller to move the rolled sheet over the platen during printing, a drawing pen, and means for controlling the pen, said rolling control method comprising the steps of:

gripping a part of the rolled sheet between the drive roller and the pinch roller;

reversibly rotating the drive roller and the pinch roller in order to feed the rolled sheet back and forth over the platen;

controlling the pen with the control means in order to perform a predetermined drawing operation on the rolled sheet;

rotating the rolling scroll in order to roll-up a slack portion of the rolled sheet accumulated after completing said predetermined drawing operation;

monitoring a load exerted on the drive roller while the slack portion is rolled up on the rotating rolling scroll;

outputting a pause command to the drive motor when a predetermined load is detected at the drive roller; and rotating the drive roller to feed out a predetermined length of the rolled sheet to the rolling scroll, said predetermined length corresponding to an amount rolled up by an inertial rotation of the rolling scroll after the pause command has been received at the drive motor, thereby preventing an application of excessive tensile forces on the rolled sheet and preventing the rolled sheet from being torn or displaced from between the drive roller and the pinch roller.

2. A rolled sheet rolling control method for a paper-moving type plotter according to claim 1, wherein the load of the drive roller is detected by an encoder.

* * * * *